United States Patent
Gile

[15] 3,674,097
[45] July 4, 1972

[54] MOTION DETECTOR FOR WEIGHING APPARATUS

[72] Inventor: Richard H. Gile, Rutland, Vt.

[73] Assignee: Howe Richardson Scale Company, Clifton, N.J.

[22] Filed: March 12, 1971

[21] Appl. No.: 123,764

[52] U.S. Cl. .................................... 177/3, 177/25, 177/50, 177/164, 177/210, 177/DIG. 3, 235/151.33
[51] Int. Cl. ............. G01g 23/10, G01g 23/365, G01g 23/37
[58] Field of Search .................. 177/1, 50, 25, 210, 211, 164, 177/DIG. 1, DIG. 3, DIG. 8, 70, 3; 235/58 PS, 61 PS, 151.33

[56] References Cited

UNITED STATES PATENTS

| | | | |
|---|---|---|---|
| 2,697,580 | 12/1954 | Howard | 177/50 |
| 3,035,648 | 5/1962 | Williams | 177/164 |
| 3,039,686 | 6/1962 | Bell et al. | 177/3 |
| 3,063,635 | 11/1962 | Gordon | 177/DIG. 8 |
| 3,124,206 | 3/1964 | Burke | 177/210 |
| 3,318,402 | 5/1967 | Kendrick | 177/50 |
| 3,458,001 | 7/1969 | Pfister | 177/164 |
| 3,476,198 | 11/1969 | Francis | 177/50 |
| 3,484,813 | 12/1969 | Davies | 177/164 |
| 3,493,773 | 2/1970 | Power | 235/151.33 |

FOREIGN PATENTS OR APPLICATIONS

| | | | |
|---|---|---|---|
| 743,530 | 1/1956 | Great Britain | 177/50 |

*Primary Examiner*—Robert S. Ward, Jr.
*Attorney*—Norris & Bateman

[57] ABSTRACT

A detector for detecting the change in the number of pulses in serially applied pulse streams by memorizing a function representing the preceding one of the two pulse stream and by comparing the memorized function with a corresponding function of the subsequentially occurring one of the two pulse streams. This detector is, among other things, applicable to sense relatively small movements of a load-receiving structure (such as a weigh hopper or platform) in a weighing system.

25 Claims, 4 Drawing Figures

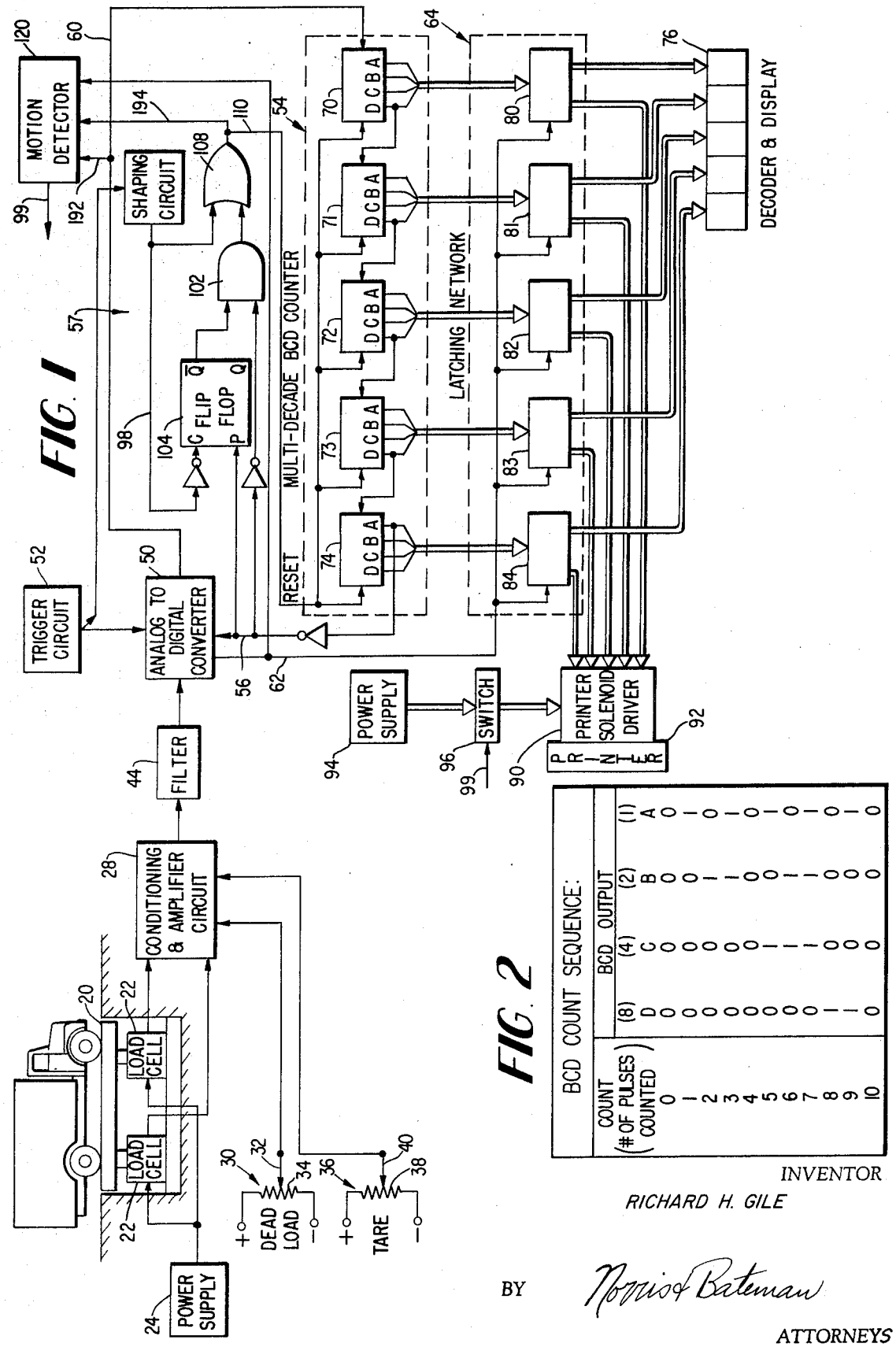

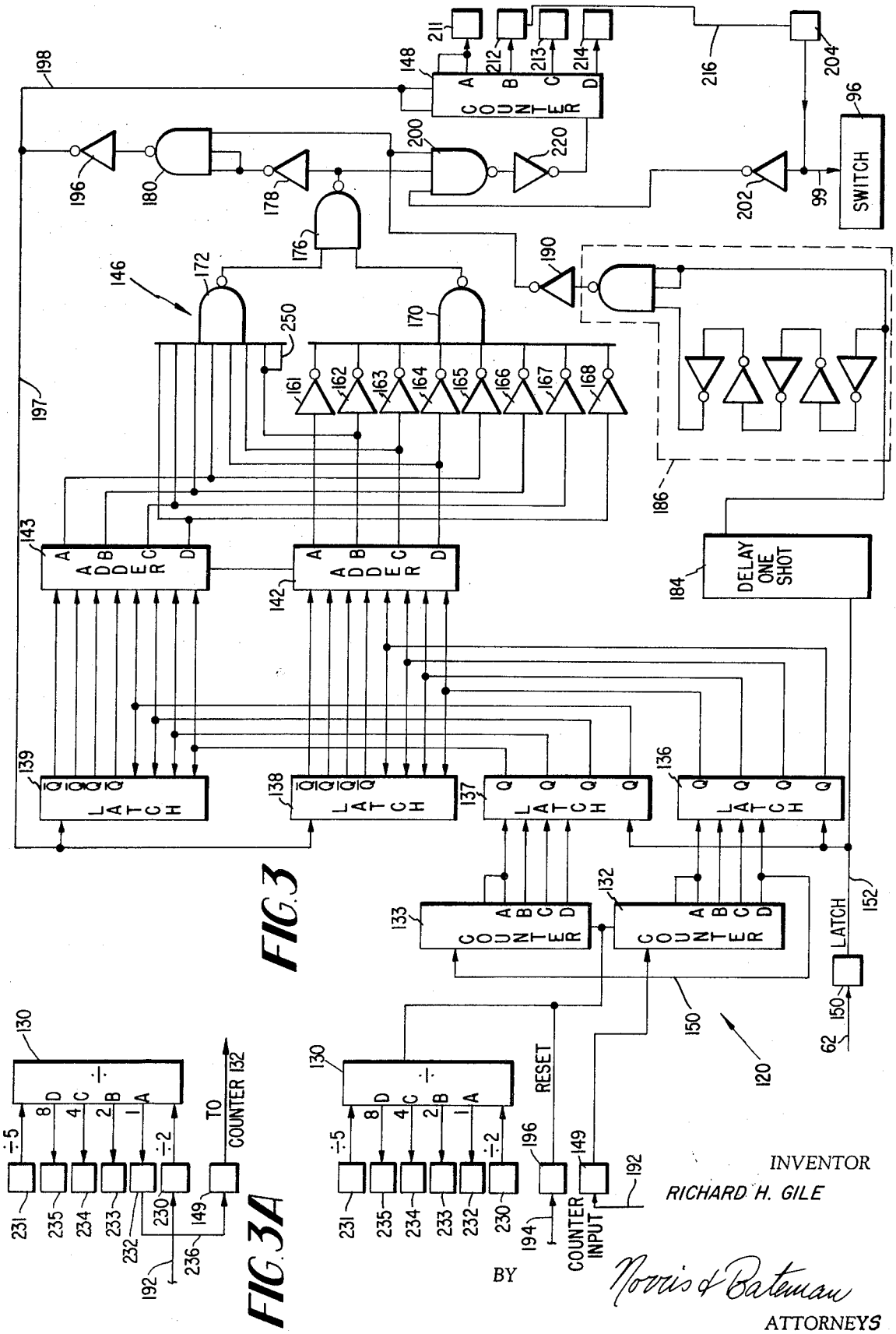

3,674,097

MOTION DETECTOR FOR WEIGHING APPARATUS

FIELD OF INVENTION

This invention relates to systems for detecting changes in data samples and is particularly applicable to motion detectors for sensing motion of the load-receiving structure in a weighing apparatus.

BACKGROUND

In recent years it has become customary to support a load-receiving structure, such as a weighing platform or hopper, by a strain gauge load cell assembly. In platform scales, for instance, the load-receiving platform may be supported directly at each corner by a load cell, and the potentials produced by the load cells are summed up to provide a D.C. signal voltage representing the weight of the load applied to the weighing platform.

As is well known, the application of a load to such a load cell supported weighing platform or other load-receiving structure causes a small, but significant deflection of platform-supporting load cell assembly, and the load cell output potential will be proportional to the forces exerted by the platform and the load on the platform. Owing to the yieldable support provided by the load cell assembly, the load, the platform, and the yieldable load cell support constitute an oscillatory system. Thus, the system, and hence the load-cell developed output potential, go through several oscillations when a load is applied to the platform. Additional oscillations will be introduced if the load is moving, owing to the kinetic energy associated with the moving load.

It, therefore, will be appreciated that inaccurate weight measurements may be obtained if the load cell developed potential is utilized while it is still unstable or oscillating. Such inaccurate weight measurement may be manifested in a read out of the weight of the applied load. Also, inaccurate weight measurements may be manifested in the delivery of inaccurate amounts of materials to a weight hopper in a batch weighing system that utilizes the load cell-developed potential to control the delivery of the materials.

It therefore is desirable to detect the motion of the scale equipment to provide an indication when the scale has stabilized. However, motion detecting equipment proposed and utilized prior to this invention was found to be incapable of adequately sensing the relatively small movements of a load cell-supported, load-receiving structure. For example, tachometers, which have been used heretofore, are unsatisfactory for accurately sensing the small movement of a load cell-supported scale platform.

SUMMARY AND OBJECTS OF INVENTION

One major object of this invention is to provide a novel motion detector that is sufficiently sensitive to accurately sense the relatively small movements of a load cell-supported, load-receiving structure in a weighing system.

The motion detector of this invention digitally compares representations of successive weight-representing pulse trains that are produced by an analog-to-digital converter. The input of the analog-to-digital converter is connected to the load cell circuit to periodically sample the load cell-developed potential and to convert each sampled potential into a train of pulses in which the number of pulses in the train is proportional to the level of the load cell developed potential.

With this information, the digital comparison is accomplished by first counting the pulses in a given pulse train to provide a binary number that is representative of the number of counted pulses. More particularly, the circuit of this invention retains at least the least significant eight-bit binary number of a multi-bit data word that is equivalent to the number of counted pulses. The retained, count-representing binary number is electrically compared with a previously produced and stored, count-representing binary number by subtracting one number from the other. If the difference deviates from zero by a predetermined magnitude, the previously stored number is replaced by the number with which it was compared. But if the difference is zero or smaller than the above-mentioned predetermined magnitude, the previously stored number is retained in storage, and a count is supplied to an acceptable-condition counter. When the count in the acceptable-condition counter reaches a pre-selected amount, it supplies a signal condition to indicate that the system has stabilized.

The signal condition from the acceptable-condition counter may be utilized to give a signal or alarm indicating that the scale is in a stabilized condition. It also may serve as a control signal to cause a printer to print out the weight of the load on the scale. Thus, in absence of the signal condition the printer is prevented from printing erroneous information while movement of the system is taking place.

By employing successive pulse trains produced by the analog-to-digital converter to achieve the desired digital comparison, this invention utilizes the high resolution of available converters. For example, one commercially available analog-to-digital converter will produce 20,000 pulses for an amplified load cell potential of 7.2 volts. The digital representation therefore constitutes 20,000 divisions or equal parts of the 7.2 volt signal. The motion detector circuit of this invention is able to detect a difference as small as one pulse between successively produced pulse trains with a relatively high degree of accuracy. It therefore will be appreciated that the detector of this invention is highly sensitive and is capable of detecting very small movements.

In the following embodiment, the motion detector of this invention is described as applied to a platform scale. It will be appreciated, however, that this invention may be applied to any form of weighing apparatus where it is desired to detect the motion of the load-receiving structure.

In addition to comparing data samples that are representative of weight, the detector of this invention is also applicable for comparing other data or information. For example, the detector of this invention may be utilized to detect changes in the number of pulses in two teletype messages. If the pulse repetition frequencies of the compared pulse streams are the same, the result will be a comparison of the lengths of the two pulse streams. This invention may also be utilized to detect a change in frequency in two pulse streams, and in such an application the pulse repetition frequency may be a function of weight or other data.

Accordingly, another major object of this invention is to provide a novel detector for senSing changes in serially applied signals.

A more specific object of this invention is to provide a novel detector for detecting a change between two serially applied signals by memorizing a representation of the preceding signal and by comparing the memorized representation with a corresponding representation of the subsequently applied signal.

DESCRIPTION OF DRAWINGS

FIG. 1 is a partially functional, schematic diagram of a platform weighing system embodying the motion detector of this invention;

FIG. 2 is a BCD truth table showing the logic states for the counters illustrated in FIG. 1;

FIG. 3 is a partially functional, schematic circuit diagram of the motion detector shown in FIG. 1; and FIG. 3A is a fragmentary diagram illustrating a variation of the circuit connections shown in FIG. 3.

DETAILED DESCRIPTION

The embodiment shown in FIG. 1 and incorporating the principles of this invention comprises a platform weighing system having a weighing platform 20 and an assembly of load cells (two shown) 22 supporting platform 20. Load cells 22 are conventionally arranged one at each of the four corners of platform 20, and platform 20 is arranged to receive a vehicle, such as a truck, or a container. Each of the load cells 20 may be of the conventional silicon or resistance strain gauge type and is excited by a suitable D.C. power supply source indicated at 24.

It will be appreciated that the algebraic summation of the load cell output signal voltages may be summed up in suitable, conventional conditioning and amplifying circuit indicated at 28.

Since the summed output signal voltage developed by the load cell assembly in this embodiment will be proportional to the weight of platform 20 as well as the weight of the load placed on platform 20, a dead weight tare adjustment is provided for by a potentiometer 30 having a moveable wiper or arm 32 which is adjustable along a resistor 34. Resistor 34 is connected across a suitable source of D.C. power, as shown. The voltage impressed on wiper 32 is conventionally applied to a suitable summing junction in circuit 28 along with the load cell assembly output signal voltage. The load cell assembly output signal voltage and the dead weight potentiometer signal voltage will be opposite in sign. Wiper 32 is adjusted to offset or tare out the weight of scale parts acting on the load cell assembly to thereby provide a zero signal voltage condition at the output of circuit 28 when no load is on platform 22. Thus, the signal voltage at the output of circuit 28 will be closely proportional to the load placed on platform 20.

An additional potentiometer 36 is advantageously provided for taring out the weight of a truck or container so as to afford a read out of the weight of a load in the truck or container. Potentiometer 36 comprises a resistor 38 connected across a suitable source of D.C. power supply and a moveable wiper or arm 40 adjustable along resistor 38. The voltage on wiper 40 is advantageously applied to the summing junction that the dead weight potentiometer signal voltage is applied to in circuit 28, and the polarity of the signal voltage developed on wiper 40 will also be opposite to that of the load cell assembly output signal voltage. Thus, the load cell assembly output signal voltage may selectively be reduced by a magnitude corresponding to the weight of the truck or container on platform 20 by adjusting potentiometer 36.

If it is desired to read out the gross weight (i.e., the weight of the truck or container and the load therein), potentiometer 36 is set to provide a zero voltage condition on wiper 40. Thus, the level of the analog D.C. signal voltage at the output of circuit 28 will be proportional to the gross weight. If it is desired to read out the net weight (i.e., only the weight of the load delivered to the truck or container on platform 20), potentiometer 36 is selectively adjusted in the previously described manner. The level of the analog D.C. signal voltage at the output of circuit 28 will therefore be proportional to the weight of the load in the truck or container on platform 20. The gain of circuit 28 is conventionally adjustable.

With continued reference to FIG. 1, the D.C. weight-representing, amplified output signal voltage of amplifier circuit 28 is applied to a filter 44 which filters out any A.C. component that may be superimposed on the D.C. signal. Desirably, filter 44 is of the low pass type having good frequency and time response characteristics to develop a filter output signal which is substantially free of A.C. components that might interfere with the trouble free operation of the system.

The amplified and conditioned, load cell-developed signal voltage at the output of filter 44 is applied to the input of an analog-to-digital converter 50. Converter 50 is of suitable, appropriate form for producing a digital representation that is related to the level of the weight-representing analog signal voltage applied to the input of the converter. In this embodiment, the digital representation is in the form of a fixed frequency pulse stream or train having equal time separations between pulses. The number of pulses in the stream is proportional to the level of the weight-representing analog signal voltage at a time when the analog signal is sampled.

Converter 50 advantageously is of the conventional dual ramp type. In this type of analog-to-digital converter, the analog signal voltage applied to the input of the converter is integrated over a fixed, predetermined time period in response to a triggering signal from a sample rate trigger circuit 52. The resulting ramp voltage that is generated is initiated from a predetermined voltage level such as zero volts. The slope of the ramp will be proportional to the level of the analog signal voltage at the moment it was sampled. During the generation of this fixed time base ramp voltage, a train of fixed frequency pulses from a clock in the analog-to-digital converter are serially routed through a gate to a multidecade BCD (Binary Coded Decimal) counter circuit generally indicated at 54 in FIG. 1.

In this embodiment, the range of converter 50 is, by way of example, zero to 20,000 pulses, and the pulse count loaded into counter circuit 54 during the fixed time base integration is 10,000 pulses. This pulse count (10,000 pulses) fixes the time interval of the first integration, and when the last of 10,000 pulses is loaded into counter circuit 54, counter circuit 54 supplies a reset signal over a line 56 to converter 50.

This reset signal switches converter 50 from the output of filter 44 to a suitable source of reference voltage as indicated at 58 in FIG. 1. Converter 50 will now integrate the analog reference signal. This reset signal is also operative through a logic circuit 57 to reset counter circuit 54 to zero.

The polarity of the reference signal from source 58 is so related to the analog signal supplied by filter 44 that integration of the reference signal is in the opposite direction as compared with the direction in which the filter output signal was integrated. Thus, a second ramp is generated starting from a voltage at which the first ramp was terminated, and this second ramp will be started in response to the reset signal from counter circuit 54. The slope of this second ramp is constant and proportional to the fixed reference voltage level, and during the time interval that the reference signal is being integrated, the converter clock pulses are routed by line 60 to counter circuit 54.

When the second ramp reaches the voltage level from which the first ramp was initiated, converter 50 supplies a latching signal over line 62 to a latching network 64. Latching network 64, as will be described in greater detail later on, is connected to the output of counter circuit 54, and when the latching signal is received from converter 50 it latches in and thereby memorizes the BCD output of counter circuit 54. It will be appreciated that the time interval of the second ramp and thus the number of converter pulses loaded into counter circuit 54 during this second time interval will be substantially proportional to the level of the analog signal supplied by filter 44 at the time that is was sampled.

Trigger circuit 52 may be of any suitable appropriate form, and it may be incorporated as part of converter 50. One form of trigger circuit provides a saw-tooth like signal voltage by cyclically charging and discharging a capacitor. The repetition rate of the saw-tooth signal voltage will determine the rate at which the weight-representing analog signal voltage is sampled.

Counter circuit 64 may be of any appropriate conventional form and is shown to comprise a series of conventional BCD electronic decade counters 70, 71, 72, 73 and 74 each having a four-bit, 1-2-4-8 BCD output and respectively representing the units, tens, hundreds, thousands and tens of thousands digits in a weight-indicating, multi-digit decimal number to be displayed by a visual, digital translator and display device 76. Counter 70-74 advantageously are the monolithic type Ser. No. 7490 having a divide-by-two stage and a divide-by-five stage.

The truth table or BCD count sequence for each of the counters 70-74 is shown in FIG. 2. Each counter will automatically reset when the signal level at its D pin changes from a high (a logical 1) to a low (a logical 0) at the tenth pulse. With the illustrated connections, each of the counters 70-73 will supply the count of 1 to the next succeeding counter for every 10 counts coming into the counter. It will be appreciated that the number of counters employed in circuit 54 will depend upon the number of decades that are desired in the number to be displayed.

Still referring to FIG. 1, latch network 64 comprises a series of BCD data word storage or memory latches 80, 81, 82, 83 and 84, one for each of the counters 70–74. Latches 80–84 advantageously are of the four-bit quad type Ser. No. 7475, each having four storage devices for storing a four-bit data word and the complement thereof. For this purpose each of the four storage devices in each latch has a Q and $\overline{Q}$ output as indicated. Each storage device also has a data bit input pin and a memory or latch pin. The data words to be stored in latches 80–84 are supplied by counters 70–74 respectively.

For the foregoing type of latch, the latching signal line 62 is connected to the latch pin of each storage device in latches 80–84. When converter 50 supplies the proper logical state on line 62, whatever binary states that are present on the data input pins of latches 80–84 will be stored on the Q output pins of the latches, and the complements will be stored on the $\overline{Q}$ output pins.

As shown, the outputs of counters 70–74 are connected in parallel to latches 80–84. The information in counters 70–74 is therefore transferred in parallel to latches 80–84 respectively. Latches 80–84 memorize this information when the proper latching logical state is supplied by converter 50 as previously described.

The Q output pins of each of the latches 80–84 are connected in parallel to one module in device 76. In this embodiment device 76 will have five modules, one for each of the latches 80–84. Device 76 may be of any suitable, conventional form for accepting a BCD input at a relatively low voltage level and for generating at each module the corresponding decimal output 0 through 9. One type of device 76 is Sigma 7, Model 32, manufactured by Sigma Instruments, Inc. of Boston, Mass. In converting back to decimal form, the truth table in FIG. 2 may be utilized to determine the number that device 76 will display in response to the data information latched on the output pins of latches 80–84.

The BCD data information latched in or memorized by latches 80–84 is also applied to a printer solenoid and solenoid driver circuit 90 of appropriate, conventional form. Energization of printer solenoids in circuit 90 actuates type in a conventional printer 92 in a known manner. Through suitable logic in circuit 90, the BCD data information applied to circuit 90 selects the printer solenoids to be energized when power is applied through a switch circuit 96 from a suitable power supply source 94.

Switch circuit 96 may comprise a suitable solid state switch or switching arrangement which is responsive to a switch control signal to complete the circuit connection for applying the power supply voltage to circuit 90 for energizing those printer solenoids that are selected by the applied BCD data information from latches 80–84. Switch circuit 96 is responsive to the removal of the switch control signal to disconnect the power supply from circuit 90.

From the foregoing it is clear that when a load is placed on platform 20, the load cell assembly will produce a D.C. analog signal voltage that is conditioned and amplified by circuit 28. The level of the D.C. analog signal voltage at the output of circuit 28 will be proportional to the Gross weight or net weight of the load depending upon the selected setting of potentiometer 36 as previously described. This weight-representing analog signal voltage is applied through filter 44 to the input of converter 50.

In response to each successive trigger signal supplied by circuit 52, converter 50 samples the analog signal voltage at its input by first integrating the sampled analog signal and then integrating the reference signal from source 58. During integration of the weight-representing analog signal voltage from filter 44, the pulses produced by converter 50 are counted by counter circuit 54, and when the pulse count reaches 10,000, a logical 1 will be provided on the A pin of counter 74. This logical state will be inverted and transferred by line 56 to cause the integrator in converter 50 to switch from filter 44 to source 58 at the proper time. It will be appreciated that counters 70–74, in counting the number of pulses in each pulse train that is supplied by converter 50, produces the equivalent 8–4–2–1 BCD data information at their output pins.

As shown in FIG. 1, the signal on line 56 is inverted again and applied to an And gate 102 in circuit 57. The other input of gate 102 is connected to the complementing output pin $\overline{Q}$ of a dual D flip flop 104 which, in this embodiment, is the type Ser. No. 7474. The signal condition on line 56 is applied without further inversion to the pre-set input pin of flip flop 104, as shown. After each conversion and in response to the next trigger signal, converter 50 supplies the counter reset signal to line 98. The reset signal on line 98 is applied to an OR gate 108. In addition it is inverted and applied to the clear pin of flip flop 104 as shown. The output of And gate 102 is connected to the other input of OR gate 108, and the output of OR gate 108 is connected by a line 110 to the reset pins of counters 70–74.

After each analog-to-digital conversion and in response to the next trigger signal supplied by circuit 52 converter 50 supplies a logical 1 to line 98, and this signal condition is ored through gate 108 to reset counters 70–74 to zero in preparation for the next conversion. In addition, a logical 0 will be applied to the clear pin of flip flop 104. This signal condition together with a logical 0 at the pre-set pin of flip flop 104 will change the state at the $\overline{Q}$ output pin of the flip flop to a logical 1. At this point, however, no information will be Anded through gate 102 since the logical state on line 56 is inverted before it is applied to gate 102. At this time, therefore, the signal conditions at the input to gate 102 will be a 0 and a 1.

As previously mentioned, converter 50, in response to the trigger signal from circuit 52 integrates the filter output voltage, and during this time, the converter's clock pulses are gated through to counter circuit 54. In this embodiment counter circuit 54 will be counting every pulse, and when the 10,000th pulse is counted in, a logical 1 is applied to the A pin of counter 74 and inverted, and the inversion is applied to line 56. Now the signal condition at the input to gate 102 will change to supply a logical 1 through gate 108 to reset the counters to zero. In addition the logical state supplied by line 56 will cause converter 50 to switch over to the reference source 58, and converter 50 contains the logic to block further spurious switch over signal conditions until the next conversion. Also a logical 1 and a logical 0 will respectively be applied to the clear and pre-set pins of flip flop 104, causing the state on the $\overline{Q}$ pin to change to a logical 0. This condition will prevent resetting of the counters in the event that the number of converter-produced pulses supplied during generation of the second ramp equals or exceeds 10,000. That is, a logical 1 at the A pin of counter 164 will not reset the counters in the count-in of the weight-representing pulse train.

As the reference signal from source 58 is integrated, converter 50 will supply the weight-representing pulse train to counter circuit 54, and the number of pulses in this train will be proportional to the level of the sampled analog signal supplied by filter 44. At the completion of the integration of the reference signal from source 58 (i.e., when the second ramp reaches the level from which the first ramp was initiated), the supply of further pulses from converter 50 is blocked, and counter circuit 54 will now have counted in the number of pulses in this weight-representing pulse train. At this time, converter 50 is responsive to supply a latch signal over line 62 to latches 80–84. In response to this latch signal latches 80–84 transfer the BCD data words supplied by counters 70–74 to their output pins Q, and to latch in or memorize the transferred BCD data words at their Q output pins. The transferred BCD data information will be latched in uncomplemented form at the Q output pins, and the complements of the transferred BCD data words will be latched in on the $\overline{Q}$ pins of the latches. Upon latching in this new information, the old information on the Q and $\overline{Q}$ pins of latches 70–74 is removed.

The memorized, weight-representing BCD data information at the Q output pins of latches 80–84 is applied to device 70 which decodes the information to display the weight in decimal form. In addition, the weight-representing BCD data information latched in at the $\overline{Q}$ output pins of latches 80–84, is applied to circuit 90 to select those printer solenoids that will be energized when switch circuit 96 is actuated to apply the power supply voltage from source 94 to circuit 90. It will be appreciated that the printer solenoids will be energized only when switch circuit 96 is actuated to complete the electrical circuit connection between source 94 and circuit 90, and switch circuit 96 will be actuated only when the previously mentioned switch control signal is applied to circuit 96 over a line indicated at 99 in FIG. 1.

In response to the next trigger signal supplied by circuit 52, converter 50 again samples the weight-representing analog signal voltage at its input. Converter 50 also responds by supplying a reset pulse over line 98, and this reset pulse is ored through gate 108 to reset counters 70–74 to zero in preparation for counting the next pulse train.

The circuitry thus far described and including counter circuit 54 and latch network 74 may be the same as that described in the U.S. copending application Ser. No. 58,260 filed on July 27, 1970, assigned to the assignee of the instant application and entitled "System".

The switch control signal is applied to line 99 by the digital motion detector circuit of this invention. The motion detector circuit is generally indicated at 120 in FIG. 1 and is effective to prevent a print-out of the weight-representing data information by printer 92 until the motion of platform 20 reduces to a predetermined magnitude and preferably to an essentially static or stable condition.

As is well known, the application of a load to the platform causes a small, but significant deflection of the platform supporting load cells, and the load cells produce an electrical output potential proportional to the deflection induced by the forces exerted by the platform and the load on the platform. Owing to the yieldable support provided by the load cells, the load, the platform and the yieldable load cell support constitutes an oscillatory system. Thus, the deflection measured by the load cells, and hence the load cell-developed output potential, goes through several cycles of oscillation when a load is applied to the weighing platform. Additional oscillations will be introduced if the load is moving due to the kinetic energy associated with the moving load.

It therefore will be appreciated that inaccurate weight measurements may be obtained if the read out is made while the oscillations are occurring. This objectionable condition is particularly prevalent in highly sensitive, high speed weighing systems such as the one thus far described.

According to this invention motion detector circuit 120 provides an indication of when the scale attains a stabilized condition after a load is applied to platform 20. That is, circuit 120 will effectively detect the motion of platform 20 and will provide an indication when the platform has stopped moving. By utilizing this detection to control operation of printer 92, printing of the weight will automatically be prevented until the oscillations cease.

As shown in FIG. 3, circuit 120 comprises a pre-stage divider 130, two cyclic four-bit binary counters 132 and 133, four four-stage flip flop quad latches or memory circuits 136, 137, 138 and 139, two four-bit binary adders 142 and 143, a logic circuit indicated at 146, and an acceptable-condition binary counter 148.

The purpose of divider 130, as will be described in detail later on, is to divide the number of pulses in the pulse train produced by converter 50 by a pre-selected divisor, so that the quotient of the division will be applied to and counted by counters 132 and 133. For this purpose, divider 130 may be of any appropriate, conventional form and is advantageously of the Ser. No. 7490N type having a divide-by-two stage and a divide-by-five stage.

EAch of the counters 132 and 133 is of suitable conventional form for counting the number of pulses or counts in a train and for supplying the equivalent four-bit binary number for the number of counts that are stored. For this purpose counters 132 and 133 are advantageously of the Ser. No. 7493N type.

As shown, the pulses to be counted are supplied from an input pin 149 to the input of counter 132. Counter 132 will count each incoming pulse, and after each sequence of 16 pulses it will reset to zero and supply a carry count over a line 150 to the input of counter 133. After each sequence of 16 transferred pulses counter 133 also resets to zero. It will therefore be appreciated that counters 132 and 133 are interconnected to provide an eight-bit binary counter for storing up to 256 counts. Thus after each sequence of 256 incoming pulses counters 132 and 133 return to their original states. In effect, therefore, the eight-bit binary counter circuit provides for the division of the incoming count by 256 and stores the remainder. This enables the lesser significant remainders to be utilized in a digital comparison by adders 142 and 143.

Each of the quad latches 136–139 is of suitable, conventional form for memorizing a four bit binary number in response to a latching signal. Each quad latch is advantageously of the Ser. No. 7475N type having four data input pins, one for each of its D type flip flop stages. Each of the flip flop stages also has a latch pin, a Q output pin and a $\overline{Q}$ output pin. As previously described, each of the latches 136–139 is responsive to the application of a latching signal to its latching pins to transfer a four-bit binary data word at its data input pins to its Q output pins and to latch or memorize the transferred data word at its Q output pins. At the same time, the complement of the transferred and latched data word will be latched in on the $\overline{Q}$ output pins of the latches.

As shown in FIG. 3, the binary data word output pins of counter 132 are connected in parallel to the data input pins of latch 136, and the binary data output pins of counter 133 are connected in parallel to the data input pins of latch 137. The pulse trains successively produced by converter 50 are applied directly to pin 149 or through divider 130 to pin 149 as will be explained in greater detail later on. The latch signal line 62, in addition to being connected to latches 80–84 is also connected to a latch input pin 152 at detector 120. Pin 150 is connected by a line 152 to the latch pin of each flip flop stage in latches 136 and 137.

Thus, the latch signal supplied by converter 50 to latches 80–84 is also supplied to latches 136 and 137. Therefore, at the same time latches 80–84 memorize the information supplied by counters 70–74, latches 136 and 137 will memorize the binary information supplied by counters 132 and 133 respectively.

EAch of the adders 142 and 143 is of appropriate, conventional form for adding two four-bit binary numbers. These adders are advantageously of the Ser. No. 7483N type having two sets of four-bit data input pins as shown.

The Q output pins of latch 136 are connected in parallel to the four data input pins of latch 138. Also, the Q output pins of latch 136 are connected in parallel to the four data input pins of one set at adder 142. The $\overline{Q}$ data output pins of latch 138 are connected in parallel to the other set of input pins at adder 142 as shown. The four Q output pins of latch 137 are connected in parallel to the data input pins of latch 139, and they are also connected in parallel to the four data input pins of one set at adder 143. The $\overline{Q}$ data output pins of latch 139 are connected in parallel to the data input pins of the other set at adder 143. Adders 142 and 143 are interconnected to provide an eight-digit adder for adding two eight-bit binary data words. The interconnection provides a carry from adder 142 to adder 143.

Still referring to FIG. 3, logic circuit 146 comprises a series of eight inverters 161, 162, 163, 164, 165, 166, 167, and 168 and two eight-input NAND gates 170 and 172. The outputs of inverters 161–168 are connected in parallel to gate 170 as shown. The four data output pins of adder 143 are indicated at A, B, C and D and are respectively connected in parallel to four inputs of gate 172 and to the input sides of inverters 165–168. The four data output pins of adder 142 are also indicated at A, B. C and D, and they are connected in parallel to the input sides of inverters 161–164. The data output pins B, C and D of adders 142 are connected to three of the four remaining inputs of gate 172, and the last input of gate 172 is tied to the B pin of adder 142, as shown. On each of the adders 142 and 143, the least significant binary digit (bit) of the four-bit number is applied to the A output pin, the next to the B pin, the next to highest to the C pin, and the most significant digit to the D pin.

The outputs of gates 170 and 172 are connected to a two-input NAND gate 176. The output of gate 176 is connected through an inverter 178 to one input of a further plural-input NAND gate 180. The other operative input of gate 180 is connected to receive a delayed, shaped, latching signal.

As will be described shortly, the signal condition at the output of gate 176 controls the application of a latch signal to latches 138 and 139. The condition at the output of gate 176 will also determine whether a count is applied to counter 148.

As shown in FIG. 3, line 152 is connected to supply the latching pulse produced by converter 50 to a delay one-shot 184. The delay one-shot is responsive to the latch pulse to produce a delayed latching pulse signal condition which is shaped by a pulse shaping network 186 of suitable form and applied to the input side of inverter 190. The output of inverter 190 is connected to one of the inputs of gate 180, as shown.

Considering operation of the motion detector circuit thus far described, it will be assumed for this first example, that the output of converter 50 is connected directly by a line 192 (FIG. 1) to pin 149 so that divider 130 will be out of the active circuit. When the triggering signal is supplied by trigger circuit 52 to converter 50, the weight-representing analog signal voltage is sampled and converter 50 initially produces a train of 10,000 pulses and a counter reset pulse as previously described. The converter-produced reset pulse, which is gated through gate 108 is applied by a line 194 (FIG. 1) to an input pin 196 (FIG. 3) at motion detector 120. Pin 196 is connected to the reset pins of counters 132 and 133 and divider 130. Thus, the converter-produced reset pulse resets counters 132 and 133 and divider 130 to zero in addition to clearing counters 70–74.

The first train containing 10,000 pulses is applied to pin 149, and these pulses are counted by counters 132 and 133 in the manner previously described. Counters 132 and 133 will store the remainder of the quotient of 10,000 divided by 256. The binary data words representing this remainder are applied to the data input pins of latches 136 and 137, but no transfer and memorization will take place since the latching signal is not present on line 152.

At the end of the first integration and generation of the 10,000 pulses, counter 74 supplies a reset signal through logic circuit 57 as previously described, and this reset signal in addition to clearing counters 70–74 is applied through line 194 to pin 196 for resetting counters 132 and 133 and divider 130 to zero. During the integration of the reference signal from source 58, the pulses in the weight-representing pulse train are gated from converter 50, applied to pin 149, and counted by counters 132 and 133.

Once again, counters 132 and 133 will store only the remainder resulting from the division of the pulse train count by 256. The binary data word representing this remainder will be produced at the output of counters 132 and 133 and applied to the data input pins of latches 136 and 137.

At the end of the second integration, converter 50 supplies the previously mentioned latching pulse which is applied through pin 150 to latches 136 and 137. Latches 136 and 137 will now transfer the binary data numbers at their inputs and will latch the transferred binary information on their Q output pins as previously explained. By latching in or memorizing this new information, old binary information at the outputs of latches 136 and 137 is removed.

The new binary data word latched in at the output of latch 136 will be applied to the inputs of latch 138 and adder 142. Also, the binary word latched in at the output of latch 137 will be applied to the inputs of latch 139 and adder 143. At this stage no latching signal is applied to latches 138 and 139 so that the applied data words will not be transferred into the latches.

Binary addition of the binary numbers at the $\overline{Q}$ output pins in latch 138 and at the Q output pins of latch 136 is performed by adder 142. Similarly, binary addition of the binary numbers at the $\overline{Q}$ output pins of latch 139 and the Q output pins of latch 137 is performed by adder 143. By using the binary numbers at the $\overline{Q}$ output pins of latches 138 and 139 the effect is a subtraction of the uncomplemented form of the information memorized in latches 138 and 139 from the new information supplied by latches 136 and 137. This will be explained in greater detail shortly.

As will become apparent shortly, logic circuit 146 will supply an acceptable signal condition (indicating no or negligible motion) when the difference between the old eight-bit binary number stored by latches 138 and 139 and the subsequent eight-bit binary number stored and presented by latches 136 and 137 is not greater than the decimal number 1. More particularly, circuit 146 will furnish an acceptable, no-motion signal condition when a eight-bit summation at the combined outputs of adders 142 and 143 is any one of the following binary numbers:

1. 00000000

2. 11111111

3. 11111110

At the first addition occurring after a load is placed on platform 20, the binary data words memorized by latches 138 and 139 will be old, uninformative data. They may be randon values or values latched in during a prior weighing cycle. Assume now that the remainder of the pulse train count that was counted and stored by counters 132 and 133 is equivalent to the decimal number 7 and that binary data word memorized at this time in latches 138 and 139 is equivalent to the decimal number 5. With the previously described circuit connections for latches 136–139 and adders 142 and 143, a complement subtraction is performed to yield the difference in terms of a binary number. That is, the addition of the complement of one binary and the uncomplemented form of another binary number yields the binary difference between the two binary numbers. Thus by applying to adders 142 and 143 the complement of the binary number stored in latches 138 and 139 and the uncomplemented binary number stored in latches 136 and 137 the output of the adders will yield the difference between the stored binary numbers. Considering the foregoing example, the complement of 00000101 (the decimal number 5) will be 11111010. This complement will be added by adders 142 and 143 to the binary number 00000111 (the decimal number 7) as follows:

```
            0 0 0 0 0 1 1 1
            1 1 1 1 1 0 1 0
1 carry  ←  0 0 0 0 0 0 0 1
```

In the circuit of this invention the carry is dropped in the binary substraction. Thus, the output at adder 142 will be 0001, and the output at adder 143 will be 0000. With this adder output, the binary number applied to gate 172 will be 00000000. As a result, the output of gate 172 will be a logical 1. Also the binary number 00000001 is inverted by inverters 161–168 and applied to the input of gate 170. Thus, the output of gate 170 will be a logical 1. Consequently, the output of gate 176 will be a logical 0. This state is inverted so that at one input a logical 1 will be applied to gate 180. Before a delayed reset pulse is supplied to gate 180, the state at the other input to gate 180 will be a logical 0. Consequently, the output of gate 180 will be a logical 1.

As shown, the output of gate 180 is connected to an inverter 196, and inverter 196 is connected by a line 197 to the latch pins at each stage in both of the latches 138 and 139. The output of inverter 196 is also connected by a line 198 to the reset pin of counter 148. Thus when a logical 1 is provided at the output of gate 180, a logical 0 will be supplied to the latch pins of latches 138 and 139 and to the reset pin of counter 148. Therefore, no reset or latching operations will be performed, until a delayed latch pulse is received.

The delay one-shot provides the necessary delay to allow adders 142 and 143 to perform their adding operation and to present the resulting logical states to gate 180 at the same time or before the reset pulse is applied to the other input of gate 180. Thus, when the delayed reset pulse is applied to gate 180, all of the input condition will be high. As a result, the output of gate 180 will go low (a logical 0), and the output of inverter 196 will go high (a logical 1). The output of inverter 196 will remain high for the duration of the reset pulse supplied to the input of gate 180. As a consequence, a positive going latching pulse is supplied by line 197 to latches 138 and 139, and the same pulse is supplied by line 198 to reset counter 148 to zero.

By applying a latching pulse to latches 138 and 139, the binary numbers supplied to the inputs of latches 138 and 139 by latches 136 and 137 will be transferred to and latched in at the output pins of latches 138 and 139. The original binary information at the outputs of latches 138 and 139 will now be replaced by the binary information supplied by latches 136 and 137. Considering the previous example, the complement of the original binary word 00000101 (decimal 5) will now be replaced by the complement of the binary word 00000111. Thus the binary number 11111000 will be memorized or latched in at the Q̄ output pins of latches 138 and 139.

As previously mentioned, counter 148 counts only the number of acceptable comparisons made by adders 142 and 143. Advantageously, counter 148 is of the four-bit binary Ser. No. 7493N type. To control the supply of counts to counter 148, a three-input NAND gate 200 has one input connected to the output of inverter 190, a second input connected to the output of gate 176, and a third input connected to the output of an inverter 202. The input of inverter 202 is connected to a pin 204, and the four flip flop stages of counter 148 are respectively connected to output pins 211, 212, 213 and 214. The logical states for the first, second, third and most significant digits in the four-bit binary number are respectively applied to pins 211-214. A jumper 216 connects a selected one of pins 211-214 to pin 204. Pin 204 is also connected to line 99 as shown.

By selectively connecting jumper 216 to pin 211 one acceptable condition counted in by counter 148 will supply the switch actuating control signal (logical 1) through pin 204 to switch 96. It will be recalled that switch 96 is actuated by the control signal to apply power from source 94 for energizing those printer solenoids that are selected for energization by the BCD data information supplied from latches 80-84. If jumper 216 is connected to pin 212, then two successive acceptable conditions must be counted by counter 148 to supply the switch actuating control signal to switches 96. If jumper 216 is connected to pin 213, then the count-in of four successive acceptable conditions are required to actuate switch 96, and so on. In this embodiment, jumper 216 is connected to pin 212, thus requiring counter 148 to count in two successive acceptable comparisons of successive weight-representing pulse trains.

Considering the previous example in which the equivalent of the decimal number 5 was stored by latches 138 and 139 and in which the binary remainder equivalent to the decimal number 7 was applied to the inputs of latches 138 and 139 and to adders 142 and 143, it will be recalled that by virtue of the digital comparison performed by adders 142 and 143, a pulse signal was applied to line 198 in addition to applying the pulse signal to line 198 for latching in the new remainder present at the data input pins of latches 138 and 139. As a result, counter 148 will be reset to zero to drop out any previously stored count.

If, for example, one count — indicating an acceptable condition — was previously stored in counter 148, it will be dropped out. Thus, for the connection shown for jumper 216 in FIG. 3, two successive acceptable conditions must be counted by counter 148 in order to change the voltage level at pin 212 to a logical 1.

Gate 200 and the connections thereto will block the transfer of a counter-actuating pulse to the input of counter 148 whenever a counter reset pulse is supplied to line 198. When a logical 0 is provided at output of gate 176 to indicate an unacceptable (i.e., unstable) condition, the state at the output of gate 200 will be a logical 1 prior to the supply of the delayed reset pulse from inverter 190. Until the count reaches 2 in counter 148, the state at pin 212 will be a logical 0, and this state is inverted by inverter 202 to apply a logical 1 to gate 200. When the delayed reset pulse is supplied from inverter 190, the logical state at the output of gate 200 will not change, owing to the presence of the logical 0 supplied from the output of gate 176. The output of gate 200 is inverted by an inverter 220, and the inverted output is applied to the input of counter 148. Thus, for the detection of an unstable condition, a logical 1 will be provided at the output of gate 200 and hence a logical 0 will be applied to he input of counter 148.

With the logic circuit shown in FIG. 3 it can be shown that a logical 0 will be provided at the output of gate 176 whenever the difference between the two binary numbers compared by adders 142 and 143 is greater than the equivalent of a decimal number 1. Each time a logical 0 is provided at the output of gate 176, counter 148 will be reset, the circuit will block the transfer of a counting pulse (a logical 1) to counter 148, and a latching pulse will be supplied to latches 138 and 139, thus causing latches 138 and 139 to drop the previously memorized information and to memorize the new binary information supplied by latches 136 and 137.

In response to the next trigger signal from circuit 52, converter 50 will respond by generating the first 10,000 count pulse train followed by the weight-representing pulse train, and at the beginning of the conversion, converter 50 will also supply a counter reset pulse all as previously described. The reset pulse, in addition to resetting counter 70-74, will also reset counter 132 and 133 and divider 130 to zero. The first train of 10,000 pulses will be counted by counters 132 and 133, but this binary information will not be memorized owing to the absence of a latching pulse on line 152 at this time. Again, the remainder of the division of 10,000 counts by 256 will be stored by counters 132 and 133.

Upon counting in the 10,000 pulses in the first train, counter 74 supplies the previously described reset signal through logic circuit 57 to reset counters 132 and 133 and divider 130 to zero in addition to resetting counters 70-74 to zero. The pulses in the following, weight-representing pulse train will now be counted by counters 132 and 133 in the manner previously explained.

Assume that the number of pulses in this next weight-representing pulse train is the same as that in the preceeding weight representing pulse train, thus indicating a stable condition for two successive sampling periods. Considering the foregoing example, the remainder stored by counter 132 and 133 will therefore be the binary equivalent of the decimal number 7, namely 00000111. This binary number will be memorized by latches 136 and 137 when converter 50 supplies the previously mentioned latching pulse to line 150. This binary information will therefore be latched in at the Q output pins of latches 136 and 137 in place of the preceeding, latched information and will be supplied to the inputs of latches 138 and 139 and adders 142 and 143.

Adders 142 and 143 will now digitally compare this new binary information with the complement of the binary number memorized by latches 138 and 139.

At this stage the binary number latched in at latches 138 and 139 will be 00000111, and the complement of this number is 11111000. This complement and the new binary number 00000111 will be added by adders 142 and 143 as follows:

```
00000111

11111000

11111111
```

Thus, the binary number 11111111 will be supplied at the combined outputs of adders 142 and 143. As a result, the inputs to gate 176 will be a logical 1 (from gate 170) and a logical 0 (from gate 172). This signal condition will provide a logical 1 at the output of gate 176. This signal state is applied to gate 200, and it is inverted and applied to gate 180. When the delayed latching pulse is supplied from inverter 190, the input signal conditions at gate 200 will all be high (logical 1's). Thus, the state at the output of gate 200 will change from a logical 1 to a logical 0. This condition is inverted by inverter 220 with the result that a positive going pulse condition (a logical 1) will be applied to the input of counter 148 for the duration of the delayed latching pulse. One count will therefore be counted in by counter 148 to place a logical 1 on pin 211.

At the same time, the application of the delayed latching pulse (a logical 1) to the input of gate 180 will not change the signal state at the output of gate 180 owing to the presence of a logical 0 at the output of inverter 178. Thus, the signal state at the output of inverter 196 will remain a logical 0. As a result, counter 148 will not reset to zero and latches 138 and 139 will not memorize the new binary information supplied by latches 136 and 137.

As will become more apparent shortly, whenever a logical 1 is provided at the output of gate 176, a count will be counted by counter 148, and latches 138 and 139 will not memorize the new information applied by latches 136 and 137. Thus, latches 138 and 139 will retain the original binary number. It also will be appreciated that anyone of the previously mentioned acceptable conditions at the output of adders 142 and 143 (namely 00000000, 11111111, or 11111110) will provide a logical 1 at the output of gate 176.

Assume now that the next weight-representing pulse train produced by converter 50 has one less pulse as compared with the preceeding weight representing pulse train. As a result, the remainder equivalent to the decimal number 6 will be stored by counters 132 and 133 and memorized by latches 136 and 137. Thus latches 136 and 137 will supply the binary number 00000110 for comparison with the complement of the number stored by latches 138 and 139. It will be recalled that the number stored by latches 138 and 139 at this stage is 00000111, the complement of which is 11111000. Adders 142 and 143 will add this complement and the newly applied number 00000110 as follows:

00000110

11111000

11111110

Since the output representing the least significant digit at adder 142 is not applied to gate 172, the input to gate 172 will be 11111111. The outputs of gates 170 and 172 will respectively be a logical 1 and a logical 0. The output of gate 176 will therefore be a logical 1.

As a result, the count in counter 148 will be advanced by one and no latching pulse will be supplied to latches 138 and 139 when the delayed latching pulse condition is supplied to the inputs of gates 200 and 180. Now counter 148 will contain the count of two to thus change the state on pin 212 to a logical 1. This signal condition is applied by line 99 to actuate switch 96. Switch 96 will therefore apply power from source 94 to circuit 90 for energizing those printer solenoids that were selected for energization by the BCD data information supplied from latches 80-84. In addition, the logical 1 at pin 212, upon being inverted by inverter 202, will block the transfer of additional counter-actuating signal conditions through gate 200.

If the last weight-representing pulse train produced by converter 50 had one more pulse than the preceeding weight-representing pulse train, then the remainder equivalent to the decimal number 8 would have been stored by counters 132 and 133 and memorized by latches 136 and 137. As a result, the binary number 00001000 would have been presented for addition along with the binary number 11111000 at adders 142 and 143, and adders 142 and 143 would add as follows:

00001000

11111000

00000000

Under these conditions, it is evident that gates 172 and 170 will respectively supply a logical 1 and a logical 0 to gate 176. Gate 176 will consequently provide a logical 1, indicating a stable or acceptable signal condition for count-in by counter 148.

It will be appreciated that the motion detector circuit provides a highly accurate, yet relatively simplified and inexpensive means for detecting variations in the load cell developed potential and, consequently, for detecting the movement of the load-receiving platform. By utilizing a pair of counters (counters 132 and 133) to count up to 256 and corresponding pairs of latches and adders, the motion detector circuit shown in FIG. 3 will be accurate to one part in 256. This accuracy can readily be increased by adding one or more counters to counter 132 and 133 to provide storage space for a number of greater than 256. In such a case it is evident that a corresponding number of latches and adders will also be added to the circuit. It is also evident that the chance of error is reduced by increasing the required number of acceptable counts in counter 148.

It also will be appreciated that the circuit shown in FIG. 3 is operative with one of the counters 132 and 133, one of the latches 136 and 137, one of the latches 138 and 139 and on of the adders 142 and 143. In such a case the possible error would be one in 16.

In addition to the foregoing, it is clear that adders 142 and 143, in adding the two binary numbers applied to their input pins, digitally compare the two numbers to provide the binary summation of the two numbers.

As previously mentioned, divider 130 is utilized where it is desired to selectively divide the converter-produced pulse train before it is applied to pin 149. As shown pins 230 and 231 are respectively connected to the divide-by-two input stage and to the divide-by-five input stage of divider 130. The A, B, C and D outputs (respectively representing the 1, 2, 4 and 8 weights in the BCD output) of divider 130 are applied to pins 232, 233, 234, 235.

If it is desired to divide the number of pulses in the converter-produced pulse train by two, then line 192 is connected to pin 230 and a jumper 236 is connected between pin 232 and pin 149, as shown in FIG. 3A. Thus, the number of pulses applied to pin 149 will be one-half the number supplied in the converter produced pulse train.

If it is desired to divide the incoming pulse train by five, then line 192 is connected to pin 231 and jumper 236 is connected between pin 235 and pin 149. Other variations may be achieved by the selective connections of line 192 to pins 230 an 231 and jumper connections from combinations of pins 232-235.

Division of the converter produced pulse train by a preselected division (such as two or five) introduces a tolerance factor into the circuit since counters 132 and 133 will now count only the resulting quotient. This technique is effective to adjust the range of acceptable conditions that will provide a count to counter 148. For example, division by two will result in an acceptable logic 1 for a difference of as much as two pulses between pulse trains. This technique is also effective to eliminate or minimize errors in the converter-produced pulse train. Such errors may emanate from noise pick up, causing the number of pulses in the pulse train to diviate from a value that is proportional to the weight of load on platform 20.

It should also be noted that the allowable one pulse error can be reduced to zero pulse error by connecting the additional input (indicated at 250 in FIG. 3) on gate 172 to the A output terminal of adder 142 and by removing gate 170.

In the foregoing embodiment, the pulse repetition rates of the pulse streams that are applied to detector 120 are constant and equal. As a result, detector 120, in sensing changes in the number of pulses in the compared functions of the two pulses streams, has the effect of comparing the lengths of successively applied pulse streams. It will be appreciated that the two eight-bit data words stored in latches 136–139 are representations an functions of the number of pulses in two pulse streams that are successively applied to the input of detector 120. The number of pulses in each of the applied pulse streams, in turn, is a representation and function of the weight applied to platform 20.

In addition to the foregoing, detector 120 may be utilized to sense changes in the pulse repetition frequency of serially applied pulse streams by employing a standardized time base for generating the latching and reset signals together with appropriate logic. In such an application the pulse repetition rate may be proportional to or a function the weight applied to a load-receiving structure in a weighting system in which the analog, load cell-produced, weight representing signal is converted into a pulse train whose pulse repetition rate is proportional to or a function of the load cell-produced analog signal.

In addition, detector 120 may be utilized in comparing data samples other than weight information. For example, it may be utilized to detect changes in the lengths of two teletype messages. Also changes in temperature or pressure may also be sensed by detector 120 by utilizing detector 120 with appropraite transducers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a weighing system, means for receiving a load to be weighed, means for producing an electrical potential that is representative of the weight of the load applied to said load receiving means and that varies in response to load-induced motion of said load-receiving means, means for periodically sampling said potential and for comparing representations of selected samples with each other for detecting variations in the magnitude of said potential and signal utilization means controlled by said comparing means.

2. In a weighing apparatus having means for receiving a load to be weighed, said load-receiving means being subject to motion under the influence of the force exerted by the load applied thereto, and means for producing a series of sequentially occurring electrical pulse trains, each of which is representative of the weight of the same load applied to said load-receiving means, the weight representing value of the pulse trains in said series being subject to variation by the force-induced motion of said load-receiving means, the improvement comprising electrical circuit means serially receiving said pulse trains for detecting variations in the weight represented by said pulse trains following application of the load to said load-receiving means.

3. The weighing apparatus defined in claim 2, wherein said electrical circuit means includes means for providing a signal when the weight representing value of the pulse trains in said series becomes substantially stabilized.

4. The weighing apparatus defined in claim 2, wherein said pulse train producing means comprises means for producing an electrical analog signal that is a function of the weight of the applied load and that is subject to variation by the force-induced motion of said load-receiving means, and means for recurrently sampling said analog signal and for converting the samples thereof into the pulse trains of said series.

5. The weighing apparatus defined in claim 4, wherein said means for converting said samples of said analog signal provides each pulse train in said series with a number of pulses that is representative of the value of said analog signal at that time it was sampled.

6. The weighing apparatus defined in claim 2, including means providing a read-out of the weight represented by a selected one of the pulse trains in said series, and means controlled by said detecting means for preventing said read-out means from providing a read-out of the weight represented by any one of said trains until any variations in the weight-representing values of said pulse trains reduce to a predetermined magnitude.

7. The weighing apparatus defined in claim 6, wherein said read-out means comprises means for printing the weight represented by the selected pulse train.

8. The weighing apparatus defined in claim 2, wherein said electrical circuit means comprises means providing an output that is indicative of any difference between the weights represented by selected pulse trains in said series.

9. The weighing apparatus defined in claim 2, wherein said electrical circuit means comprises means for sequentially converting said weight-representing pulse trains into digital signals, each of which is a function of the weight represented by the pulse train from which it was derived, and means providing an output that is indicative of the difference between selected ones of said digital signals.

10. The weighing apparatus defined in claim 2, wherein said electrical circuit means includes means providing an output that is indicative of the difference between the weight represented by each of the pulse trains following a predetermined one of the trains in said series and the weight represented by a selected previously occurring one of said pulse trains.

11. In a weighing apparatus having means for receiving a load to be weighed, and means for producing a series of sequentially occurring electrical pulse trains having a common weight-representing characteristic, each characteristic of the pulse trains in said series being representative of the weight of the same load applied to said load-receiving means, the improvement comprising electrical circuit means receiving said pulse trains for detecting variations in said weight-representing characteristic.

12. The weighing apparatus defined in claim 11, wherein said characteristic is the number of pulses in each pulse train.

13. In a weighing apparatus having means for receiving a load to be weighed, and means for producing a series of sequentially occurring electrical pulse trains, each of which is representative of the weight of the same load applied to said load-receiving means, the improvement comprising electrical circuit means serially receiving said pulse trains for detecting variations in the weight represented by the pulse trains in said series.

14. The weighing apparatus defined in claim 13, wherein said pulse train producing means comprises means for producing a D.C. signal voltage that is a function of the weight of the load applied to said load-receiving means, and means for recurrently sampling said signal voltage and converting the samples thereof into the pulse trains of said series.

15. The weighing apparatus defined in claim 14, wherein said means for converting said samples of said analog signal provides each pulse train in said series with a number of pulses that is representative of the magnitude of said signal voltage at that time it was sampled.

16. The weighing apparatus defined in claim 13, including means providing a read-out of the weight represented by a selected one of the pulse trains in said series, and means controlled by said electrical circuit means for preventing said read-out means from providing a read-out of the weight represented by any one of said trains until any variations in the weight representing values of said pulse trains reduce to a predetermined magnitude.

17. The weighing apparatus defined in claim 16, wherein said read-out means comprises means for printing the weight represented by the selected pulse train.

18. The weighing apparatus defined in claim 13, wherein said electrical circuit means comprises means providing an output that is indicative of the difference between the weights represented by selected pulse trains in said series.

19. The weighing apparatus defined in claim 13, wherein said electrical circuit means comprises means for sequentially converting said weight-representing pulse trains into digital signals, each of which is a function of the weight represented by the pulse train from which it was derived, and means providing an output that is indicative of the difference between selected ones of said digital signals.

20. The weighing apparatus defined in claim 13, wherein said electrical circuit means includes means for sequentially converting said pulse trains in a series of digital signals, each of which is a function of the weight represented by the pulse train from which it was derived, and means providing an output that it indicative of the difference between each of said digital signals following a predetermined one of the signals in said series and a previously occurring selected one of said digital signals.

21. In a weighing apparatus having means for receiving a load to be weighed, and means for producing a series of sequentially occurring electrical pulse trains, each of which is representative of the weight of the same load applied to said load-receiving means, and the improvement comprising electrical circuit means serially receiving said pulse trains and comprising means for sequentially converting said pulse trains into a corresponding series of sequentially occurring digital signals, each of which is a function of the weight represented by the pulse train from which it was derived, electrical storage means for storing a digital signal that is derived from a selected one of said sequentially occurring digital signals, means receiving the digital signal stored by said storage means and said sequentially occurring digital signals for providing an output that varies in accordance the difference between said selected one of said sequentially occurring digital signals an each of the sequentially occurring digital signals occurring subsequent to said selected one of said signals as long as the signal that is derived from said selected one of said digital signals remains stored in said storage means, and signal utilization means under the control of said output.

22. The weighing apparatus defined in claim 21, wherein said pulse train producing means provides each of said pulse trains with a number of pulses that is representative of the weight of said load.

23. The weighing apparatus defined in claim 22, wherein said electrical circuit means further includes means controlled by said output for replacing the signal stored by said storage means with another digital signal that is derived from a subsequently occurring one of said sequentially occurring digital signals whenever the difference between the selected one of said digital signals and said subsequently occurring one of said digital signals exceeds a predetermined magnitude.

24. The weighing apparatus defined in claim 22, wherein said sequentially occurring digital signals and the signal stored by said storage means are in binary coded form, wherein the signal stored in said storage means is the complement of said selected one of said sequentially occurring signals, and wherein said output providing means is operative to add each of said sequentially occurring digital signals to the signal stored by said storage means to provide said output with a value that is representative of the sum of the added signals.

25. In a weighing apparatus, means for receiving a load to be weighed, means for producing an electrical potential that is a function of the load applied to said load-receiving means, means for recurrently sampling said electrical potential to provide a series of sequentially occurring electrical signals that are representative of the sampled portions of said potential, and electrical circuit means for detecting variations of said potential by comparing each of said signals following a selected one of said signals with a selected previously occurring one of said signals.

* * * * *

UNITED STATES PATENT OFFICE
CERTIFICATE OF CORRECTION

Patent No. 3,674,097                    Dated July 4, 1972

Inventor(s) Richard H. Gile

It is certified that error appears in the above-identified patent and that said Letters Patent are hereby corrected as shown below:

Column 2, line 46, change "senSing" to --sensing--.

* Column 4, line 6, change "themoment" to --the moment--.

Column 8, line 37, change "pin" to --pins--.

Column 8, line 45, change "EAch" to --Each--.

Column 10, lines 6 and 7, change "subtraction" to --substraction--.

* Column 10, line 30, change "randon" to --random--.

Column 10, line 47, change "111111010" to --11111010--.

* Column 10, line 49, change "0000111" to --00000111--.

Column 12, line 14, change "he" to --the--.

Column 12, line 32, change "counter" to --counters--.

Column 12, line 49, change "counter" to --counters--.

Column 14, line 21, change "counter" to --counters--.

Column 14, line 29, change "on" to --one--.

* Column 14, line 67, change "diviate" to --deviate--.

Column 15, line 2, change "pulses" to --pulse--.

* Column 15, line 16, after "function" insert --of--.

Column 15, line 17, change "weighting" to --weighing--.

Page 2

UNITED STATES PATENT OFFICE
CERTIFICATE OF CORRECTION

Patent No. 3,674,097            Dated July 4, 1972

Inventor(s) Richard H. Gile

It is certified that error appears in the above-identified patent and that said Letters Patent are hereby corrected as shown below:

* Column 15, lines 25 and 26, change "appropraite" to --appropriate--.

* Column 15, line 31, after "accordance" insert --with--.

Signed and sealed this 17th day of April 1973.

(SEAL)
Attest:

EDWARD M. FLETCHER, JR.            ROBERT GOTTSCHALK
Attesting Officer                     Commissioner of Patents